United States Patent [19]
Mihara et al.

[11] Patent Number: 5,926,206
[45] Date of Patent: Jul. 20, 1999

[54] DIGITAL BROADCAST RECEIVER HAVING A TIME SHIFTING FUNCTION

[75] Inventors: Yoshikazu Mihara, Kawanishi; Kiyoshi Awano; Masatoshi Yuasa, both of Hirakata, all of Japan

[73] Assignee: Sanyo Electric Co., Ltd., Osaka, Japan

[21] Appl. No.: 08/819,010

[22] Filed: Mar. 17, 1997

[30] Foreign Application Priority Data

Mar. 21, 1996 [JP] Japan ................................. 8-063980

[51] Int. Cl.$^6$ .................................................. H04N 7/173
[52] U.S. Cl. ................................. 348/7; 348/12; 455/4.2
[58] Field of Search .................................. 348/7, 10, 12, 348/13; 455/4.2, 5.1; H04N 7/173

[56] References Cited

U.S. PATENT DOCUMENTS 5,172,413  12/1992  Bradley ..................................... 455/3.1
5,357,276  10/1994  Banker et al. .
5,477,263  12/1995  O'Callaghan et al. .
5,729,280   3/1998  Inoue ........................................ 348/10

FOREIGN PATENT DOCUMENTS

92/11713   7/1992   WIPO .

*Primary Examiner*—Sherrie Hsia
*Attorney, Agent, or Firm*—Nikaido Marmelstein Murray & Oram LLP

[57] ABSTRACT

A digital broadcast receiver for realizing functions approximately corresponding to those of a VCR by utilizing a time shifting service broadcasting the same program on a plurality of channels which are time-shifted from one another in broadcasting the program by varying periods of delay time. For example in resuming viewing after an interruption of viewing on the desired one of the channels to realize the function of pause, the channel is determined the delay time of which relative to the channel initially viewed is greater than and most approximate to the interruption period, and the initial channel is automatically changed over to the channel thus determined.

6 Claims, 6 Drawing Sheets

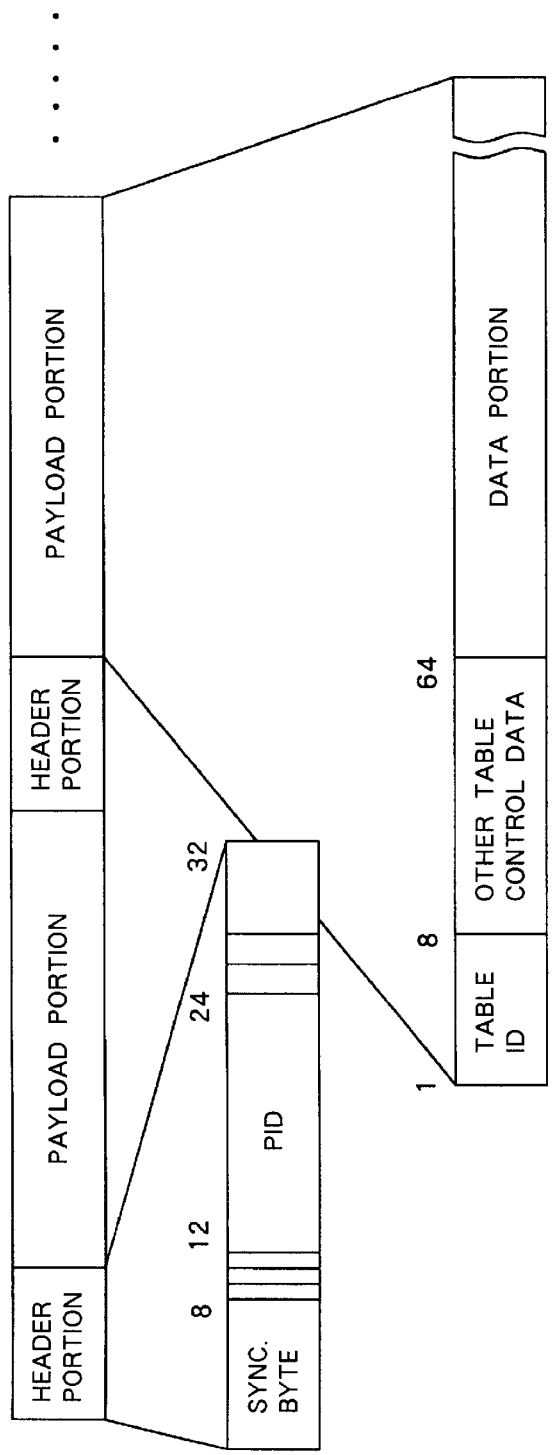
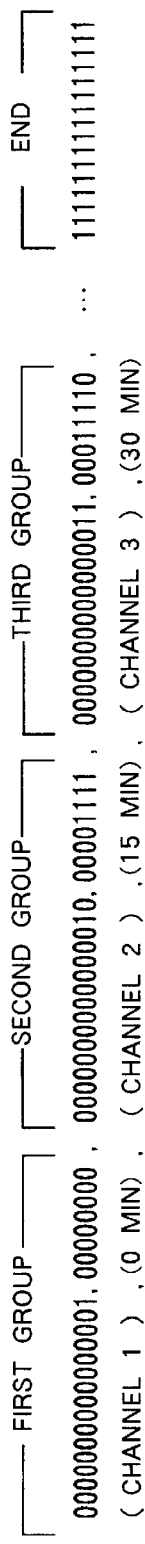
FIG. 4(a)
FIG. 4(b)

FIG. 5(a)

| INTERRUPT START TIME | 18:20 |
|---|---|
| CHANNEL | ABSOLUTE DELAY TIME |
| A | 0:00 |
| B (CURRENT CHANNEL) | 0:15 |
| C | 0:30 |

FIG. 5(b)

| INTERRUPT END TIME | 19:00 |
|---|---|
| A | 0:00 |
| B | 0:15 |
| C | 0:30 |
| D | 0:45 |
| E | 1:00 |
| F | 1:15 |
| G | 1:30 |

DIGITAL BROADCAST RECEIVER HAVING A TIME SHIFTING FUNCTION

FIELD OF THE INVENTION

The present invention relates to digital broadcast receivers, and more particularly to a digital broadcast receiver which is adapted for automatic channel change-over according to the contemplated purpose.

BACKGROUND OF THE INVENTION

Digital broadcasting systems are scheduled to provide a time shifting service to broadcast a particular program on a plurality of channels A to E as offset by stepwise varying periods of delay time as shown in FIG. 7.

When the subscriber performs a viewing starting procedure for the time shifting service before the broadcast starting time of the channel on which the broadcast starts latest, the broadcast starts immediately thereafter on one of the channels, so that a near video on demand function resembling a video on demand function can be realized with respect to channel selection.

The video on demand service provides the same function of pause, rewind or fast forward as is available with a video cassette recorder (VCR), whereas the near video on demand service is not adapted for such a function of the VCR since a plurality of subscribers watch a program on a single channel.

On the other hand, U.S. Pat. No. 5,357,276 proposes a method of realizing functions nearly corresponding to the functions of pause, rewind and fast forward of the VCR by utilizing a time shifting broadcast service. With this method, however, the amounts of time shift of a plurality of channels are registered as fixed values in advance, so that if the time shift data is altered after the registration, an error is likely to occur unless the time shift data is updated. Further since one channel is merely changed over to another by a single keying action in realizing the function generally corresponding to rewind or fast forward, key manipulation must be repeated a number of times to reach the desired channel, hence a cumbersome procedure.

SUMMARY OF THE INVENTION

An object of the present invention is to provide a digital broadcast receiver which is adapted to realize functions corresponding to those of pause, rewind and fast forward of the VCR free of errors and by a simple procedure utilizing a time shifting broadcast service.

The present invention provides a first digital broadcast receiver for receiving a time shifting service broadcasting the same program on a plurality of channels which are time-shifted from one another in broadcasting the program by varying periods of delay time, to realize a function approximately corresponding to that of pause (interruption of viewing) of a VCR, the receiver comprising manipulation means for inputting a viewing interrupt command and a viewing resuming command, time measuring means for measuring the period of interrupt time after the viewing interrupt command is given and until the viewing resuming command is given, memory means for obtaining and storing the delay time of the plurality of channels, search means for searching the memory means in response to the viewing resuming command and determining the channel the delay time of which relative to the channel initially viewed is greater than and most approximate to the interrupt time, and channel change means for changing over the channel initially viewed to the channel determined.

When the subscriber gives a viewing interrupt command while viewing one of the channels on the digital broadcast receiver described, the time measuring means immediately starts to measure time. When the subscriber thereafter gives a viewing resuming command, the time measuring means calculates the period of interrupt time and feeds the result to the search means. Upon or prior to the transmission of the viewing resuming command, the memory means obtains the delay time of the channels from multiplexed data sent forward by digital broadcasting and stores the delay time.

The search means thereafter searches the memory means and determines the channel to which the channel initially viewed is to be changed over. Since the channel determined has relative to the initial channel a delay time greater than the interrupt time, no portion of the program will be missed despite the change of channel. Further because the delay time of the channel determined relative to the initial channel is most approximate to the interrupt time, the overlapping portion of the program involved in viewing can be minimized.

When the memory means is adapted to obtain the delay time upon the transmission of the viewing resuming command, the latest data as to the delay time of the channels is available, with the result that even if an alteration is made in the delay time before the viewing resuming command is given, an accurate pause operation can be realized based on the altered data.

The present invention provides a second digital receiver for receiving a time shifting service broadcasting the same program on a plurality of channels which are time-shifted from one another in broadcasting the program by varying periods of delay time, to realize a function approximately corresponding to rewind or fast forward of a VCR, the receiver comprising manipulation means for inputting a time difference for rewind or fast forward, memory means for obtaining and storing the delay time of the plurality of channels, calculation means for calculating a target delay time upon input of the time difference by adding or subtracting the input time difference to or from the delay time of the channel currently being viewed, search means for searching for the channel having a delay time most approximate to the target delay time, and channel change means for changing over the initially viewed channel to the channel searched for.

When the subscriber inputs a command for reverse corresponding to rewind of the VCR or a command for forward corresponding to fast forward of the VCR and inputs a desired time difference while viewing one of the channels on the digital receiver described, the input data is fed to the calculation means. Upon or prior to the input of the time difference, the memory means obtains the delay time of the channels from multiplexed data forwarded by digital broadcasting and stores the delay time.

The calculation means then adds (in the case of reverse), or subtracts (in the case of forward) the input time difference to or from the delay time of the channel currently being viewed to calculate a target delay time. The result of calculation is fed to the search means.

With reference to the result, the search means searches the memory means and determines the channel to which the initially viewed channel is to be changed over. Since the channel determined has a delay time most approximate to the target delay time relative to the initial channel, the desired reverse (or forward) operation will be realized.

When the memory means is adapted to obtain the delay time upon the input of the desired time difference, the latest data as to the delay time of the channels is available, with the result that even if an alteration is made in the delay time before the time difference is input, an accurate reverse or forward operation can be realized based on the altered data.

As described above, the digital broadcast receivers embodying the invention realize a function corresponding to the function of pause, reverse or fast forward of the VCR by utilizing a time shifting broadcast service.

BRIEF DESCRIPTION OF THE DRAWINGS

FIGS. 4(a) and 4(b) are diagrams showing the packet construction of multiplexed digital data for digital broadcasting;

FIGS. 5(a) and 5(b) are diagrams showing a storage format of program delay data;

DETAILED DESCRIPTION OF EMBODIMENT

An embodiment of the invention will be described below in detail with reference to the drawings.

Figure 1:
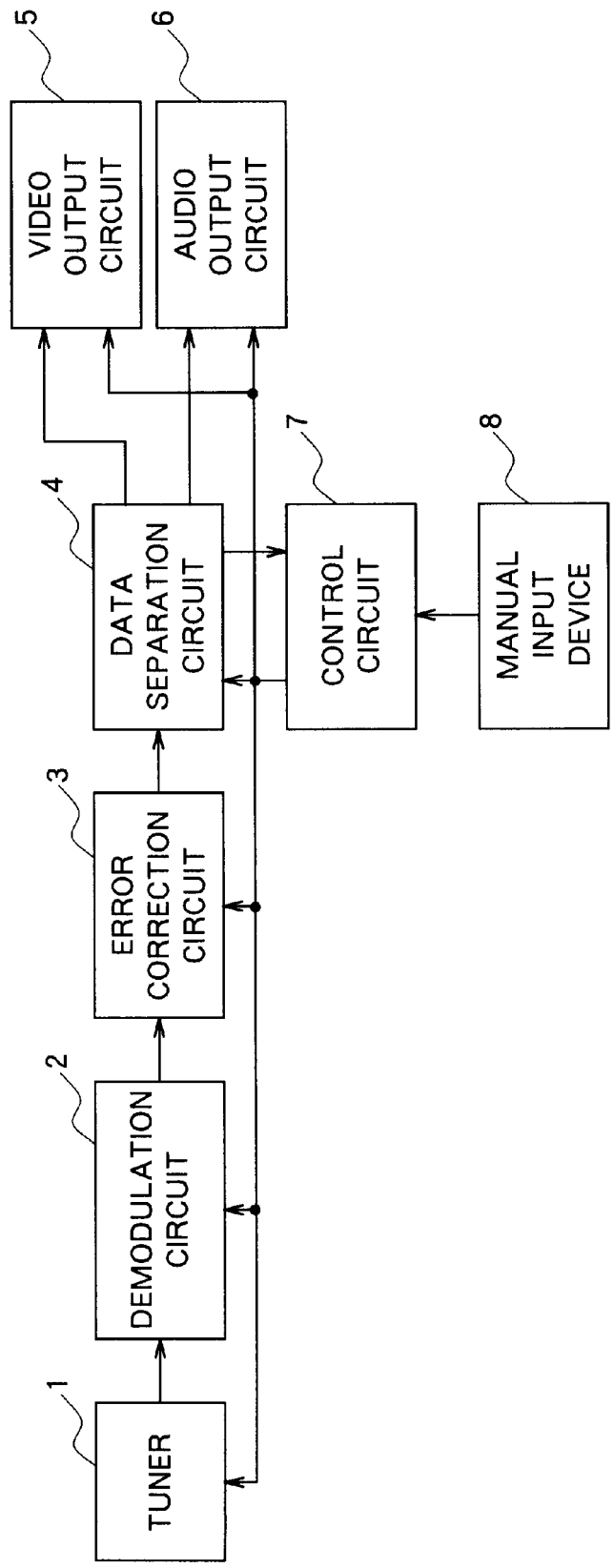
FIG. 1 is a block diagram showing the construction of a digital broadcast receiver embodying the invention.

FIG. 1 shows the construction of a digital broadcast receiver according to the invention.

A digital broadcast signal received by a tuner 1 is fed to a demodulation circuit 2 and thereby demodulated to digital data, which is then passed through an error correction circuit 3 for the correction of errors and thereafter separated as desired into video, audio and control data by a data separation circuit 4.

The video data separated is fed to a video output circuit 5, by which the data is decoded into a video signal and then delivered to a display device (not shown). The audio data separated is fed to an audio output circuit 6 and thereby decoded into an audio signal, which is then output to a speaker device (not shown). The control data separated is fed to a control circuit 7.

The control circuit 7 decodes the control data and manipulation data input from a manual input device 8 to control the overall receiver in accordance with the results of decoding.

Figure 2:
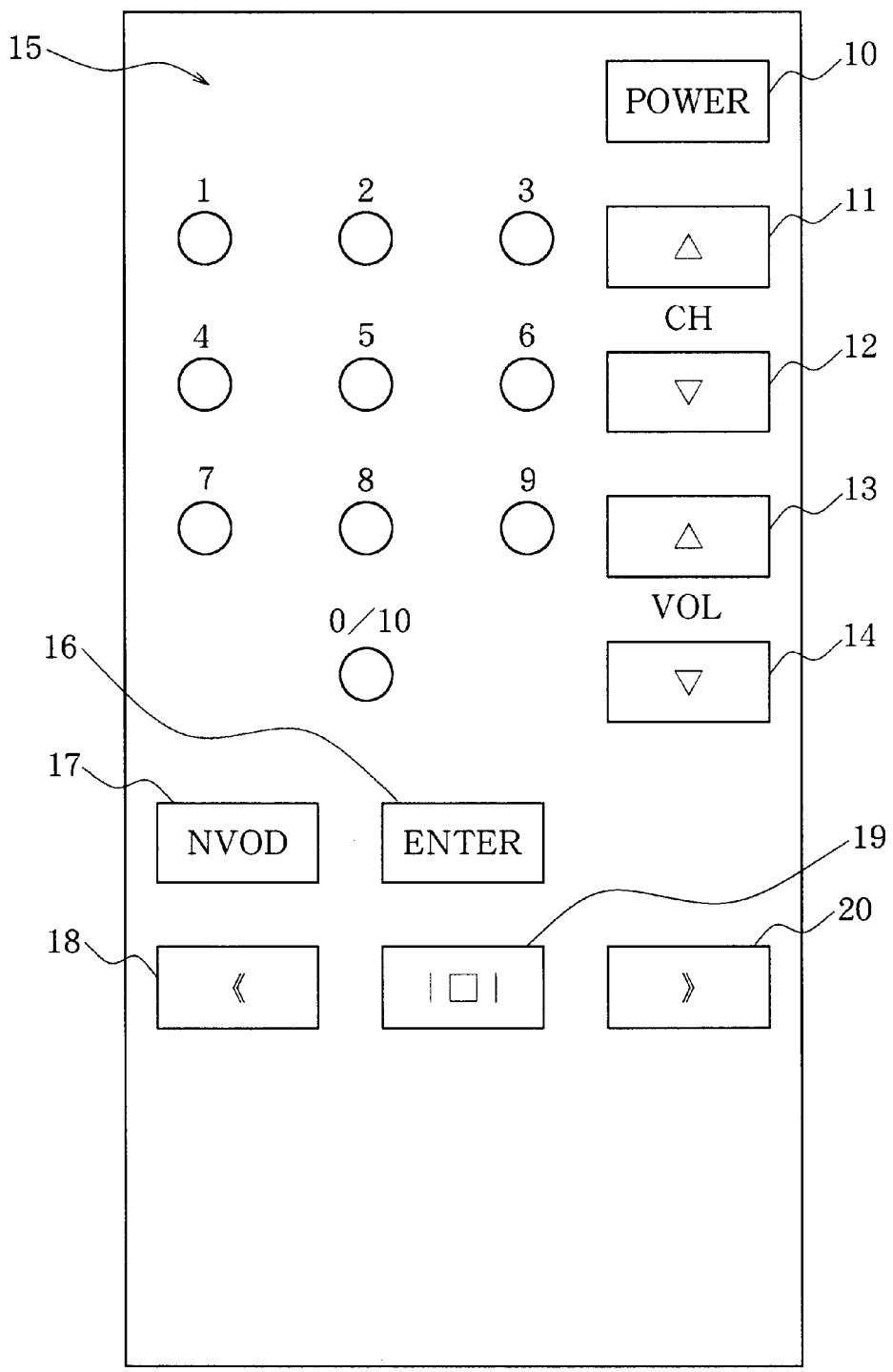
FIG. 2 is a plan view showing an arrangement of keys on a remote controller.

Usable as the manual input device 8 is an infrared remote controller shown in FIG. 2. The remote controller has common manual keys, i.e., POWER key 10, CHANNEL UP key 11, CHANNEL DOWN key 12, VOLUME UP key 13, VOLUME DOWN key 14, numeric keys 15 for entering, for example, the number of channel to be viewed and ENTER key 16 to be manipulated after a numerical value is keyed in with use of numeric keys. Also arranged on the remote controller are manipulation keys characteristic of the invention, i.e., NVOD (near video on demand) key 17 to be pressed for NVOD viewing, and reverse key 18, pause key 19 and forward key 20 to be manipulated respectively for reverse, pause and forward as will be described later. The numeric keys 15 are used also for inputting time data for the reverse procedure or forward procedure.

FIG. 4(a) shows the packet structure of multiplexed digital data (transport stream) for digital broadcasting. Each packet comprises a header portion and a payload portion.

The header portion includes the first to eighth bits serving as a synchronization byte for effecting packet synchronization, and the twelfth to twenty-fourth bits serving as a packet identification number (PID). This value indicates the attribute of data of the payload portion. The data separation circuit 4 of FIG. 1 extracts the packet of specified PID in response to a command from the control circuit 7.

The payload portion shown in FIG. 4(a) includes the first to eighth bits providing a table ID to represent the type of the data included in the payload portion. The attribute and type of all the data can be detected from the combination of the PID of the header portion and the table ID of the payload portion, making possible the data separation by the data separation circuit 4 of FIG. 1.

According to the present embodiment, 100 is assigned to the PID, and 100 to the table ID, and the data portion is given the format shown in FIG. 4(b). Sixteen bits are used for the channel number, and eight bits for the delay time (in minutes). A required umber of such 24-bit groups are repeated from the starting end of the data portion. A channel number comprising bits 1 only is attached to the tail end of the data.

Figure 3:
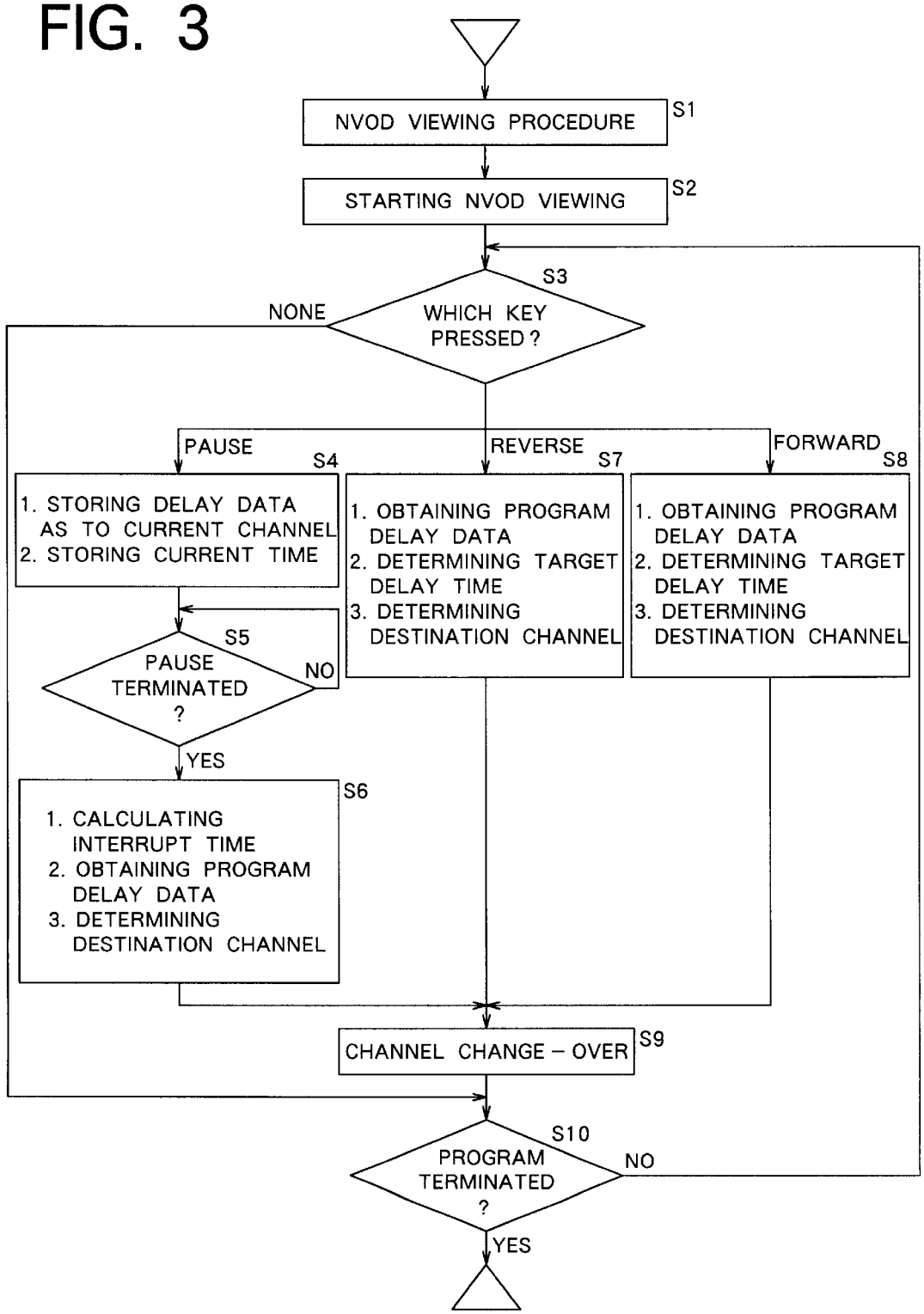
FIG. 3 is a flow chart showing a channel change control procedure for near video on demand viewing.

FIG. 3 shows a procedure for receiving time shifting broadcast service by the digital broadcast receiver described.

After the power source is turned on by pressing the POWER key 10, a channel providing the time shifting service is selected by pressing the CHANNEL UP key 11, CHANNEL DOWN key 12 or numeric key(s) 15. The NVOD key 17 is then pressed, whereupon a request for NVOD viewing is made in step S1 of FIG. 3, followed by a viewing procedure including a request for charging. Consequently when the time comes to start the selected program, step S2 is executed for the subscriber to start to view the program.

Step S3 then checks which of the pause key 19, reverse key 18 and forward key 20 has been pressed. Step S4 follows when the pause key is pressed, or step S7 follows when the reverse key is pressed, or step S8 follows if the forward key is pressed. The sequence advances to step S10 if none of these keys is pressed.

When the pause key is pressed, program delay data as to the channel currently being viewed is stored along with the current time in step S4. FIG. 5(a) shows an example of what is stored at this time.

Subsequently, an inquiry is made in step S5 of FIG. 3 as to whether a command is given to terminate the pause. When the answer is affirmative, step S6 follows to calculate the time elapsed from the current time stored as stated above, i.e., an interrupt time. Furthermore, program delay data as to all channels on which the same program is being broadcast is obtained and stored. FIG. 5(b) shows an example of which is stored at this time. The program was available on three channels A, B and C at the time when the pause was started, while the program is broadcast additionally on four channels D to G when the pause is terminated.

Further in step S6 of FIG. 3, the destination channel to be accessed by skipping is determined based on the interrupt time and the program delay data. More specifically, the program delay data is checked to select the channel whose delay time relative to the channel initially viewed is greater than the interrupt time and most approximate to the interrupt time.

If no corresponding channel is found, the channel whose relative delay time is greatest is selected. If the initially viewed channel is the final channel, the final channel is to be selected.

Since the interrupt time is 40 minutes in the case of the examples of FIGS. 5(a) and 5(b), the channel E (45 minutes in relative delay time) is selected the delay time of which relative to the channel B initially viewed is greater than 40 minutes and most approximate to 40 minutes.

Figure 6:
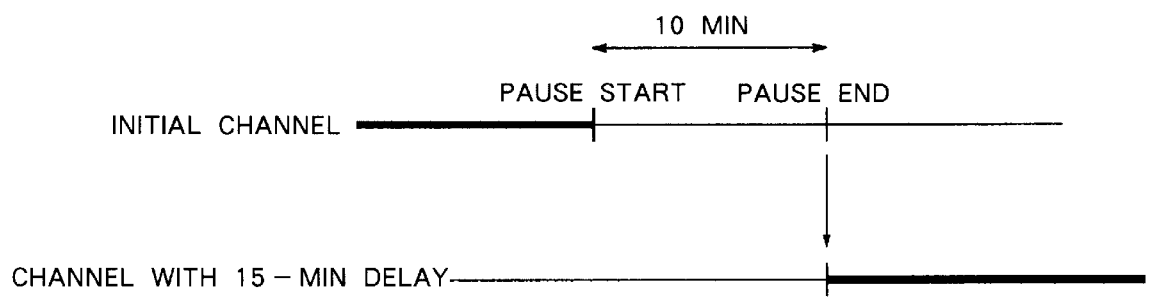
FIG. 6 is a diagram for illustrating a channel change-over when the controller is manipulated for a pause.
Figure 7:
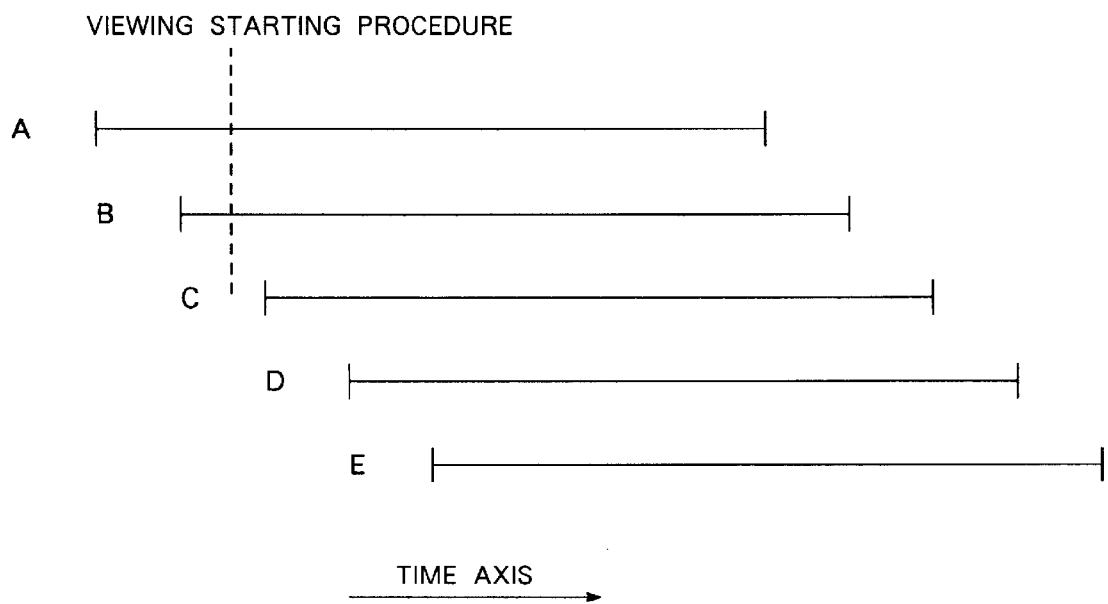
FIG. 7 is a diagram for illustrating the concept of a time shifting broadcast service.

A channel change-over is thereafter made in step S9 of FIG. 3. For example, suppose a channel with a delay of 15 minutes is selected in the case where the interrupt time after the start of the pause and until the termination of the pause is 10 minutes as seen in FIG. 6. The channel change is then made upon the termination of the pause. Although this results in a 5-minute overlapping portion in viewing the program, no portion of the program will be missed.

An inquiry is made in step S10 as to whether the program has come to an end. The sequence returns to step S3 if the answer is negative. The NVOD viewing procedure is terminated when the answer is affirmative.

When the reverse key is pressed, step S7 is performed to obtain program delay data and thereafter determine a target delay time by adding a desired reverse time to the delay time of the channel currently being viewed. The channel having a delay time most approximate to the target delay time is then selected and determined as the destination channel to be accessed by skipping. For example, when the controller is manipulated for 20-minute reverse during viewing the channel B in the example of FIG. 5(b), 20 minutes is added to the 15-minute delay time of the channel B to determine a 35-minute target delay time. The channel C having a delay time (30 minutes) most approximate to this target delay time is then determined as the destination channel.

Alternatively, it is possible to select the channel having a delay time greater than the target delay time and most approximate to the target delay time and determine this channel as the destination channel. For example, when a command for 20-minute reverse is given while the channel B is being viewed in the example of FIG. 5(b), the channel D is selected which has a delay time (45 minutes) greater than the target delay time of 35 minutes and most approximate to 35 minutes.

Step S9 then follows for a channel change-over. An inquiry is made in step S10 as to whether the program has come to an end. The sequence returns to step S3 if the answer is negative. The NVOD viewing procedure is terminated when the answer is affirmative.

When the forward key is pressed, step S8 is performed to obtain program delay data and thereafter subtract a desired forward time from the delay time of the channel currently being viewed, whereby a target delay time is determined. The channel having a delay time most approximate to the target delay time is selected and determined as the destination channel to be accessed by skipping.

For example, when the controller is manipulated for 20-minute forward during viewing the channel E in the example of FIG. 5(b), 20 minutes is subtracted from the 60-minute delay time of the channel E to determine a 40-minute target delay time. The channel D having a delay time (45 minutes) most approximate to this target delay time is then determined as the destination channel.

Alternatively, it is possible to select the channel having a delay time smaller than the target delay time and most approximate to the target delay time and determine this channel as the destination channel. For example, when a command for 20-minute forward is given while the channel E is being viewed in the example of FIG. 5(b), the channel C is selected which has a delay time (30 minutes) smaller than the target delay time of 40 minutes and most approximate to 40 minutes.

Step S9 then follows for a channel change-over. An inquiry is made in step S10 as to whether the program has come to an end. The sequence returns to step S3 if the answer is negative. The NVOD viewing procedure is terminated when the answer is affirmative.

As described above, the digital broadcast receiver embodying the invention is adapted to realize functions resembling the functions of pause, rewind and fast forward of a VCR. In connection with pause, especially, viewing can be resumed immediately after the controller is manipulated for the termination of pause without the likelihood of missing any portion of the program. Further for rewind or fast forward, the desired time difference is input, thereby ensuring an immediate and rapid change-over to a channel on which the program is available with a time difference most approximate to the contemplated rewind time or fast-forward time, or to a channel on which there is no likelihood of missing any portion of the program to be viewed by rewind or fast forward.

The embodiment described above is intended to illustrate the present invention and should not be construed as limiting the invention defined in the appended claims or restricting the scope thereof. The receiver of the present invention is not limited to the foregoing embodiment in construction but can of course be modified variously without departing from the spirit of the invention as set forth in the claims.

What is claimed is:

1. A digital broadcast receiver for receiving a digital broadcast wherein the same program is broadcast on a plurality of channels time-shifted from one another by varying periods of delay time with respect to the program broadcasting time, the receiver being adapted for an automatic channel change-over without missing any portion of the program for resuming viewing after an interruption of viewing on one of the channels, the digital broadcast receiver being characterized in that the receiver comprises:

manipulation means for inputting a viewing interrupt command and a viewing resuming command, time measuring means for measuring the period of interrupt time after the viewing interrupt command is given and until the viewing resuming command is given, memory means for obtaining and storing the delay time of the plurality of channels, search means for searching the memory means in response to the viewing resuming command and determining the channel the delay time of which relative to the channel initially viewed is greater than and closest to the interrupt time, and channel change means for changing over the channel initially viewed to the channel determined.

2. A digital broadcast receiver as defined in claim 1 wherein the memory means obtains the delay time of the plurality of channels from a digital broadcast signal and stores the delay time immediately after the viewing resuming command is given.

3. A digital broadcast receiver for receiving a digital broadcast wherein the same program is broadcast on a plurality of channels time-shifted from one another by varying periods of delay time with respect to program broadcasting time, the receiver being adapted for an automatic change-over from the channel being currently viewed to another channel having a desired time difference, the digital broadcast receiver being characterized in that the receiver comprises:

manipulation means for inputting the time difference, memory means for obtaining and storing the delay time of the plurality of channels, calculation means for calculating a target delay time upon input of the time difference by adding or subtracting the input time difference to or from the delay time of the channel currently being viewed, search means for searching for the channel having a delay time closest to the target delay time, and channel change means for changing over the initially viewed channel to the channel searched.

4. A digital broadcast receiver as defined in claim 3 wherein the memory means obtains the delay time of the plurality of channels from a digital broadcast signal and stores the delay time immediately after the desired time difference is input.

5. A digital broadcast receiver for receiving a digital broadcast wherein the same program is broadcast on a plurality of channels time-shifted from one another by varying periods of delay time with respect to program broadcasting time, the receiver being adapted for an automatic change-over from the channel being currently viewed forwardly to another channel on which the program precedes with a desired time difference or reversely to another channel on which the program follows with a desired time difference, the digital broadcast receiver being characterized in that the receiver comprises:

manipulation means for inputting a program forward or reverse command and the desired time difference, memory means for obtaining and storing the delay time of the plurality of channels, calculation means for calculating a target delay time upon input from the manipulation means by subtracting the input time differences from the delay time of the channel currently being viewed when the program is to be forwarded or by adding the input time difference to the delay time of the channel being viewed when the program is to be reversed, search means for searching the channel having a delay time smaller than and closest to the target delay time when the program is to be forwarded or searching for the channel having a delay time greater than and closest to the target delay time when the program is to be reversed, and channel change means for changing over the initially viewed channel to the channel searched for.

6. A digital broadcast receiver as defined in claim 5 wherein the memory means obtains the delay time of the plurality of channels from a digital broadcast signal and stores the delay time immediately after the desired time difference is input.

* * * * *

UNITED STATES PATENT AND TRADEMARK OFFICE
CERTIFICATE OF CORRECTION

PATENT NO. : 5,926,206
DATED : July 20, 1999
INVENTOR(S) : Mihara, et. al.

It is certified that error appears in the above-identified patent and that said Letters Patent is hereby corrected as shown below:

Column 6, Line 46, please insert --,-- after the word "channel"

Signed and Sealed this

Fourteenth Day of December, 1999

Attest:

Q. TODD DICKINSON

Attesting Officer

Acting Commissioner of Patents and Trademarks